(12) United States Patent
Thangarasa et al.

(10) Patent No.: US 11,218,932 B2
(45) Date of Patent: Jan. 4, 2022

(54) CELL CHANGE IN A WIRELESS COMMUNICATION SYSTEM

(71) Applicant: Telefonaktiebolaget LM Ericsson (publ), Stockholm (SE)

(72) Inventors: Santhan Thangarasa, Vällingby (SE); Muhammad Kazmi, Sundbyberg (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 266 days.

(21) Appl. No.: 16/330,421

(22) PCT Filed: Oct. 11, 2017

(86) PCT No.: PCT/SE2017/051002
§ 371 (c)(1),
(2) Date: Mar. 5, 2019

(87) PCT Pub. No.: WO2018/070926
PCT Pub. Date: Apr. 19, 2018

(65) Prior Publication Data
US 2020/0413311 A1   Dec. 31, 2020

Related U.S. Application Data

(60) Provisional application No. 62/406,788, filed on Oct. 11, 2016.

(51) Int. Cl.
*H04W 4/00*   (2018.01)
*H04W 36/08*   (2009.01)
(Continued)

(52) U.S. Cl.
CPC ....... *H04W 36/08* (2013.01); *H04W 36/0085* (2018.08); *H04W 36/00837* (2018.08); *H04W 36/30* (2013.01)

(58) Field of Classification Search
CPC ....... H04W 36/00837; H04W 36/0085; H04W 36/30
See application file for complete search history.

(56) References Cited

U.S. PATENT DOCUMENTS

| 8,483,168 B2 | 7/2013 | Ji et al. |
| 10,292,077 B2 | 5/2019 | Basu Mallick et al. |

(Continued)

FOREIGN PATENT DOCUMENTS

| CN | 106171013 A | 11/2016 |
| RU | 2468515 C2 | 11/2012 |

(Continued)

OTHER PUBLICATIONS

Sony, "Open Issues on Cell Reselection for Enhanced Coverage", 3GPP TSG-RAN WG2 Meeting #92, Anaheim, USA, Nov. 16, 2015, pp. 1-3, R2-156557, 3GPP.

(Continued)

*Primary Examiner* — Justin Y Lee
(74) *Attorney, Agent, or Firm* — Coats & Bennett, PLLC

(57) ABSTRACT

A method is performed in a wireless communication system (10). The method may comprise ranking a first cell (22A) and a second cell (22B) of the wireless communication system (10) according to one or more defined cell-ranking criteria. The method may also comprise evaluating that the second cell (22B) has met a reselection criterion for a wireless device (16), provided that the second cell (22B) is ranked better than the first cell (22A) by at least a margin. The value of the margin may depend on a coverage level of the wireless device (16) with respect to the first cell (22A) and a coverage level of the wireless device (16) with respect to the second cell (22B).

10 Claims, 16 Drawing Sheets

(51) Int. Cl.
*H04W 36/00* (2009.01)
*H04W 36/30* (2009.01)

(56) References Cited

U.S. PATENT DOCUMENTS

| | | | | |
|---|---|---|---|---|
| 2009/0286539 | A1* | 11/2009 | Rangaiah | H04W 48/20 455/435.1 |
| 2014/0148172 | A1* | 5/2014 | Brisebois | H04W 16/14 455/438 |
| 2015/0085829 | A1* | 3/2015 | Bawaskar | H04W 36/30 370/332 |
| 2019/0007884 | A1* | 1/2019 | Koskinen | H04W 28/20 |

FOREIGN PATENT DOCUMENTS

| | | |
|---|---|---|
| WO | 2014057441 A2 | 4/2014 |
| WO | 2015094365 A1 | 6/2015 |

OTHER PUBLICATIONS

Catt, "Discussion on Cell Selection for CE Mode", 3GPP TSG RAN WG2 Meeting #89bis, Bratislava, Slovakia, Apr. 20, 2015, pp. 1-3, R2-151212, 3GPP.

Gemalto N.V., "Mobility Considerations for NB-IoT", 3GPP TSG-RAN WG2 #95bis, Kaohsiung, Taiwan, Oct. 10, 2016, pp. 1-3, R2-166130, 3GPP.

Intel Corporation, "Idle Mode Mobility Impacts for NB-IOT", 3GPP TSG RAN WG2 NB-IOT, Budapest, Hungary, Jan. 19, 2015, pp. 1-4, R2-160444, 3GPP.

3rd Generation Partnership Project, "3rd Generation Partnership Project; Technical Specification Group Radio Access Network; Evolved Universal Terrestrial Radio Access (E-UTRA); User Equipment (UE) procedures in idle mode (Release 14)", Technical Specification, 3GPP TS 36.304 V14.0.0, Sep. 1, 2016, pp. 1-46, 3GPP, France.

Mediatek Inc., "NB-IOT—Cell Selection and Reselection", 3GPP TSF RAN WG2 NB-IOT Ad-hoc Meeting, Budapest, Hungary, Jan. 19, 2016, pp. 1-5, R2-160509, 3GPP.

NTT Docomo, Inc., "Remaining mobility aspects for eMTC UEs", 3GPP TSG-RAN WG2 #92, Anaheim, US, Nov. 16, 2016, pp. 1-4, R2-156246, 3GPP.

3rd Generation Partnership Project, "3rd Generation Partnership Project; Technical Specification Group Radio Access Network; Evolved Universal Terrestrial Radio Access (E-UTRA); Requirements for support of radio resource management (Release 13)", Technical Specification, 3GPP TS 36.133 V13.5.0, Sep. 1, 2016, pp. 1-2226, 3GPP, France.

3rd Generation Partnership Project, "LTE;Evolved Universal Terrestrial Radion Access (E-UTRA) Medium Access Control (MAC) protocol specification", 3GPP TS 36.321 version 13.0.0 Release 13, Technical Specification, ETSI TS 136 321 V13.0.0, Feb. 1, 2016, pp. 1-84, ETSI.

Ericsson, "Idle Mode Mobility in NB-IoT", 3GPP TSG-RAN WG2 Meeting NB-IOT Ad-Hoc, Budapest, Hungary, Jan. 19, 2016, pp. 1-7, R2-160449, 3GPP.

Ericsson, "Discussion on Cell Re-Selection Margin of NB-IOT Cells in Idle State", 3GPP TSG RAN WG4 Meeting #80bis, Ljubljana, Slovenia, Oct. 10, 2016, pp. 1-2, R4-167843, 3GPP.

Catt, "Discussion on Mobility Support for Low Complexity MTC UEs and MTC Coverage Enhancement", 3GPP TSG RAN WG2 Meeting #84, San Francisco, USA, Nov. 11, 2013, pp. 1-4, R2-134040, 3GPP.

Qualcomm Incorporated, "RSRP Bias in Idle Mode Re-Selection in Enhanced Coverage in eMTC", 3GPP TSG-RAN WG4 Meeting #80bis, Ljubljana, Slovenia, Oct. 10, 2016, pp. 1-2, R4-168113, 3GPP.

\* cited by examiner

| FIRST CELL 22A | SECOND CELL 22B | VALUE OF M |
|---|---|---|
| COVERAGE LEVEL 2 | COVERAGE LEVEL 2 | M1 |
| COVERAGE LEVEL 2 | COVERAGE LEVEL 1 | M2 |
| COVERAGE LEVEL 1 | COVERAGE LEVEL 1 | M3 |

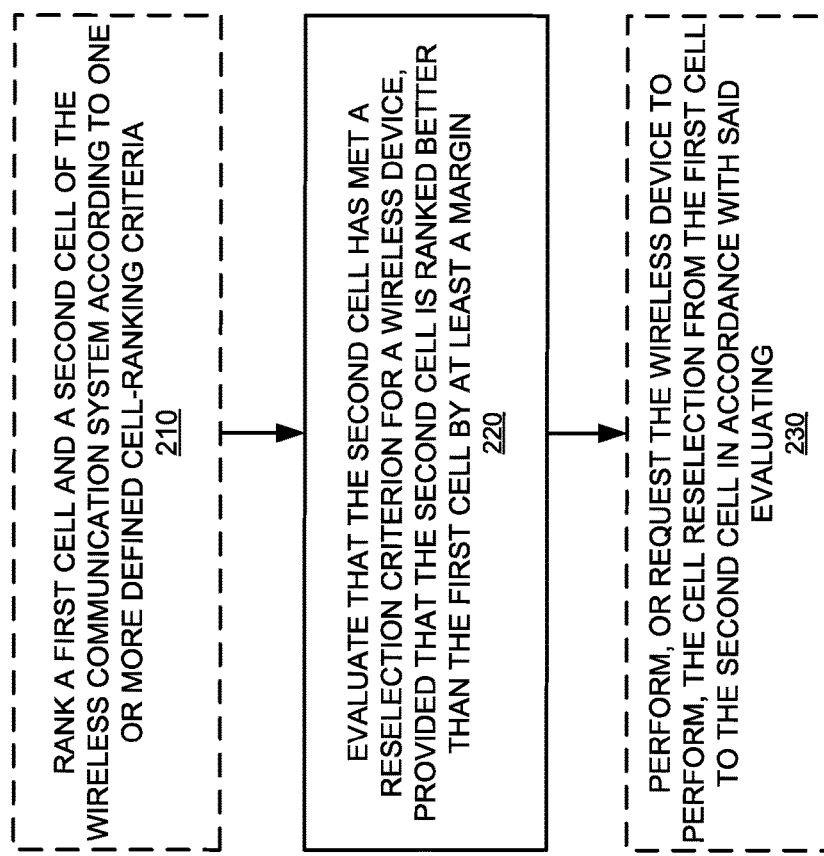

|   | Reference cell | Target cell | Cell change criteria |
|---|---|---|---|
| 1 | EC | NC | Max($\alpha 1$, $\alpha 2$) |
| 2 | EC | EC | Max($\alpha 1$, $\alpha 2$) |
| 3 | NC | NC | Max($\alpha 1$, $\alpha 2$) |
| 4 | NC | EC | Max($\alpha 1$, $\alpha 2$) |

Table 1

Cell change scenarios/combinations between enhanced coverage (EC) cells and normal coverage (NC()) cells

FIGURE 8

| Accuracy | | | Conditions | | | |
|---|---|---|---|---|---|---|
| Normal condition | Extreme condition | Es/Iot | E-UTRA operating band groups [Note 2] | Io [Note 1] range | | |
| | | | | Minimum Io | | Maximum Io |
| dB | dB | dB | | dBm/15kHz | dBm/BW$_{Channel}$ | dBm/BW$_{Channel}$ |
| ±[TBD] | ±[TBD] | ≥-6 dB | NFDD_G | [TBD] | N/A | [TBD] |
| ±[TBD] | ±[TBD] | ≥-6 dB | NFDD_G | N/A | [TBD] | [TBD] |
| NOTE 1: Io is assumed to have constant EPRE across the bandwidth. | | | | | | |
| NOTE 2: E-UTRA operating band groups are as defined in Section 3.5. | | | | | | |

Table 2

NRSRP Intra frequency absolute accuracy for UE Category NB1 for HD-FDD

*FIGURE 9*

| Coverage level of UE with respect to a cell | Magnitude of Absolute NRSRP accuracy levels (dB) |
|---|---|
| Enhanced coverage (EC) | α1 |
| Normal coverage (NC) | α2 |

Table 3

Absolute and relative NRSRP levels for enhanced and normal coverage

*FIGURE 10*

| | Reference cell | Target cell | Cell change criteria |
|---|---|---|---|
| 1 | EC | NC | $\text{Max}(\beta 1, \beta 2)$ |
| 2 | EC | EC | $\text{Max}(\beta 1, \beta 2)$ |
| 3 | NC | NC | $\text{Max}(\beta 1, \beta 2)$ |
| 4 | NC | EC | $\text{Max}(\beta 1, \beta 2)$ |

Table 4

Cell change scenarios/combinations between enhanced coverage (EC) cells and normal coverage (NC) cells

*FIGURE 11*

| Coverage level of UE with respect to a cell | Magnitude of Relative NRSRP accuracy levels (dB) |
|---|---|
| Enhanced coverage (EC) | β1 |
| Normal coverage (NC) | β2 |

Table 5

Absolute and relative NRSRP levels for enhanced and normal coverage

FIGURE 12

|   | Reference cell | Target cell | Cell change criteria |
|---|---|---|---|
| 1 | EC | NC | Max($\beta 1$, $\beta 2$, $\alpha 1$, $\alpha 2$) |
| 2 | EC | EC | Max($\beta 1$, $\beta 2$, $\alpha 1$, $\alpha 2$) |
| 3 | NC | NC | Max($\beta 1$, $\beta 2$, $\alpha 1$, $\alpha 2$) |
| 4 | NC | EC | Max($\beta 1$, $\beta 2$, $\alpha 1$, $\alpha 2$) |

Table 6

Cell change scenarios/combinations between enhanced coverage (EC) cells and normal coverage (NC) cells; based on maximum of magnitude of absolute and relative measurement accuracies of measurements performed on cell1 and cell2.

FIGURE 13

Table 4.6.2.4-1: $T_{detect,NB\_intra\_EC}$, $T_{measure,NB\_intra\_EC}$ and $T_{evaluate,NB\_intra\_EC}$

| DRX cycle length [s] | $T_{detect,NB\_intra\_EC}$ [s] (number of DRX cycles) | $T_{measure,NB\_intra\_EC}$ [s] (number of DRX cycles) | $T_{evaluate,NB\_intra\_EC}$ [s] (number of DRX cycles) |
|---|---|---|---|
| 1.28 | [532] ([415]) | 1.28 ([1]) | [12.8] ([10]) |
| 2.56 | [532] ([208]) | 2.56 ([1]) | [15.36] ([6]) |
| 5.12 | [1063] ([208]) | 5.12 ([1]) | [20.48] ([4]) |
| 10.24 | [1063] ([104]) | 10.24 ([1]) | [30.72] ([3]) |

Table 4.6.2.4-2: $T_{detect,NB\_intra\_EC}$, $T_{measure,NB\_intra\_EC}$ and $T_{evaluate,NB\_intra\_EC}$ for UE configured with eDRX_IDLE cycle

| eDRX_IDLE cycle length [s] | DRX cycle length [s] | PTW length [s] | $T_{detect,NB\_intra\_EC}$ [s] (number of DRX cycles) | $T_{measure,NB\_intra\_EC}$ [s] (number of DRX cycles) | $T_{evaluate,NB\_intra\_EC}$ [s] (number of DRX cycles) |
|---|---|---|---|---|---|
| 20.48 ≤ eDRX_IDLE cycle length ≤ 10485.76 | 1.28 | ≥15 | $eDRX\_cycle\_length \times \left\lceil \frac{[406]}{\lfloor PTW / DRX\_cycle\_length \rfloor} \right\rceil$ ([406]) | 1.28 ([1]) | [12.8] ([10]) |
| | 2.56 | ≥17.5 | | 2.56 ([1]) | [15.36] ([6]) |
| | 5.12 | ≥22.5 | | 5.12 ([1]) | [20.48] ([4]) |
| | 10.24 | ≥32.5 | | 10.24 ([1]) | [30.72] ([3]) |

NOTE 1: The number of DRX cycles in this table is given for the DRX cycles within PTWs.
NOTE 2: The eDRX_IDLE cycle lengths are as specified in Section X of TS 24.008 [34].

*FIGURE 14A*

Table 4.6.2.4-3: Conditions on NSCH Ês/Iot of identified and of the neighbour cell

| NSCH Ês/Iot of already identified cell including serving cell: Q1 | Neighbouring cell NSCH Ês/Iot: Q2 | $T_{detect,EUTRAN\_intra,CA\_tdd1}$ (s) | M (dB) |
|---|---|---|---|
| $-15 \leq Q1 < -6$ | $-15 \leq Q2 < -6$ | Requirements in Table 4.6.2.4-1 apply. | 11 |
| $-15 \leq Q1 < -6$ | $Q2 \geq -6$ | Requirements in 4.6.2.2 apply | 11 |
| $Q1 \geq -6$ | $Q2 \geq -6$ | Requirements in 4.6.2.2 apply | 7 |

*FIGURE 14B*

CELL CHANGE IN A WIRELESS COMMUNICATION SYSTEM

RELATED APPLICATIONS

This application claims priority to U.S. Provisional Application Ser. No. 62/406,788 filed Oct. 11, 2016, the entire contents of which are incorporated herein by reference.

TECHNICAL FIELD

The present application relates generally to a wireless communication system, and more particularly to a cell change in such a system.

BACKGROUND

Machine-to-machine (M2M) communication is used for establishing communication between machines and between machines and humans. The communication may involve exchange of data, signaling, measurement data, configuration information etc. The device size may vary from that of a wallet to that of a base station. The M2M devices are quite often used for applications like sensing environmental conditions (e.g. temperature reading), metering or measurement (e.g. electricity usage etc.), fault finding or error detection etc. In these applications, the M2M devices are active very seldom but over a consecutive duration depending upon the type of service e.g. about 200 ms once every 2 seconds, about 500 ms every 60 minutes etc. An M2M device may also do measurement on other frequencies or other RATs. M2M communication is also known as machine type communication (MTC).

The Narrow Band Internet of Things (NB-IoT) is a radio access for cellular internet of things (IoT), based to a great extent on a non-backward-compatible variant of Evolved Universal Terrestrial Radio Access (E-UTRA), that addresses improved indoor coverage, support for massive number of low throughput devices, low delay sensitivity, ultra-low device cost, low device power consumption and (optimized) network architecture.

NB-IoT and other systems therefore may be intended to work in a wide range of channel conditions, with device deployment scenarios ranging from open-air devices in very good channel conditions to in-wall devices in very poor channel conditions. As devices move, the devices may need to change the cell from which it accesses the system from one cell to another cell. Challenges however arise in the context of NB-IoT and other systems with widely varying channel conditions that make it difficult to ensure that a device changes to the most suitable cell available.

SUMMARY

Some embodiments herein evaluate whether a wireless device is to perform a cell change, in a way that accounts for the fact that the wireless device may have different coverage levels with respect to different cells. Evaluation of whether the device is to change from a first cell to a second cell may for instance be based on the coverage level of the device with respect to the first cell and the coverage level of the device with respect to the second cell. Evaluating whether the device is to perform a cell change in this way may advantageously prevent the device from performing a cell change to a less suitable cell, e.g., due to measurement bias.

More particularly, embodiments herein include a method performed in a wireless communication system in a context where the cell change comprises cell reselection. The method may comprise ranking a first cell and a second cell of the wireless communication system according to one or more defined cell-ranking criteria. The method may also comprise evaluating that the second cell has met a reselection criterion for a wireless device, provided that the second cell is ranked better than the first cell by at least a margin. The value of the margin may depend on a coverage level of the wireless device with respect to the first cell and a coverage level of the wireless device with respect to the second cell. In other words, the value of the margin may depend on respective coverage levels with which the first and second cells are accessible by the wireless device.

In any of these embodiments, the value of the margin may be specified by a table that maps different possible combinations of the coverage level of the wireless device with respect to the first cell and the coverage level of the wireless device with respect to the second cell to different possible values of the margin.

In any of these embodiments, the value of the margin may depend on a relation between a signal quality measurement performed on a signal from the first cell and a signal quality measurement performed on a signal from the second cell.

In any of these embodiments, the value of the margin may be specified by a table that maps different possible combinations of signal quality ranges, within which signal quality measurements performed on signals from the first and second cells are included, to different possible values of the margin.

In some embodiments, the method may further comprise performing, or requesting the wireless device to perform, the cell change from the first cell to the second cell in accordance with the evaluating.

In any of the embodiments, the margin may comprise a maximum between a measurement inaccuracy level associated with measurement performed for the coverage level of the wireless device with respect to the first cell and a measurement inaccuracy level associated with measurement performed for the coverage level of the wireless device with respect to the second cell. Alternatively or additionally, the margin may comprise a maximum between a measurement inaccuracy level defined for the coverage level of the wireless device with respect to the first cell and a measurement inaccuracy level defined for the coverage level of the wireless device with respect to the second cell. In either case, the measurement inaccuracy levels may include magnitudes of absolute or relative reference signal received power accuracy levels of the first and second cells.

In some embodiments, the method is performed by the wireless device. In other embodiments, the method is performed by a network node in the wireless communication system. In some embodiments, the wireless communication system is a narrowband internet of things (NB-IoT) system.

One or more embodiments herein thereby provide for an adaptive cell change procedure, e.g., under extended coverage.

Embodiments herein also include corresponding apparatus, computer programs, and carriers (e.g., non-transitory computer readable medium).

For example, some embodiments include a node for use in a wireless communication system. The node may for instance be a wireless device or a network node (e.g., base station). Regardless, the node may be configured to rank a first cell and a second cell of the wireless communication system according to one or more defined cell-ranking criteria. The node may also be configured to evaluate that the second cell has met a reselection criterion for a wireless device, provided that the second cell is ranked better than the first cell by at least a margin. The value of the margin may depend on a coverage level of the wireless device with respect to the first cell and a coverage level of the wireless device with respect to the second cell. In other words, the value of the margin may depend on respective coverage levels with which the first and second cells are accessible by the wireless device.

BRIEF DESCRIPTION OF THE DRAWINGS

FIG. 4 is a logic flow diagram of a method performed in the wireless communication system according to other embodiments.

FIG. 8 is a table showing different possible combinations of coverage levels of a wireless device with respect to different cells and the corresponding cell change criteria, according to some embodiments.

FIG. 9 is a table showing absolute NRSRP measurement accuracy levels according to some embodiments.

FIG. 10 is a table showing absolute and relative NRSRP levels for enhanced and normal coverage according to some embodiments.

FIG. 11 is a table showing different possible combinations of coverage levels of a wireless device with respect to different cells and the corresponding cell change criteria, according to other embodiments.

FIG. 12 is a table showing relative NRSRP measurement accuracy levels according to some embodiments.

FIG. 13 is a table showing different possible combinations of coverage levels of a wireless device with respect to different cells and the corresponding cell change criteria, according to still other embodiments.

FIGS. 14A-14B are tables of values used for cell reselection according to some embodiments.

DETAILED DESCRIPTION

Figure 1:
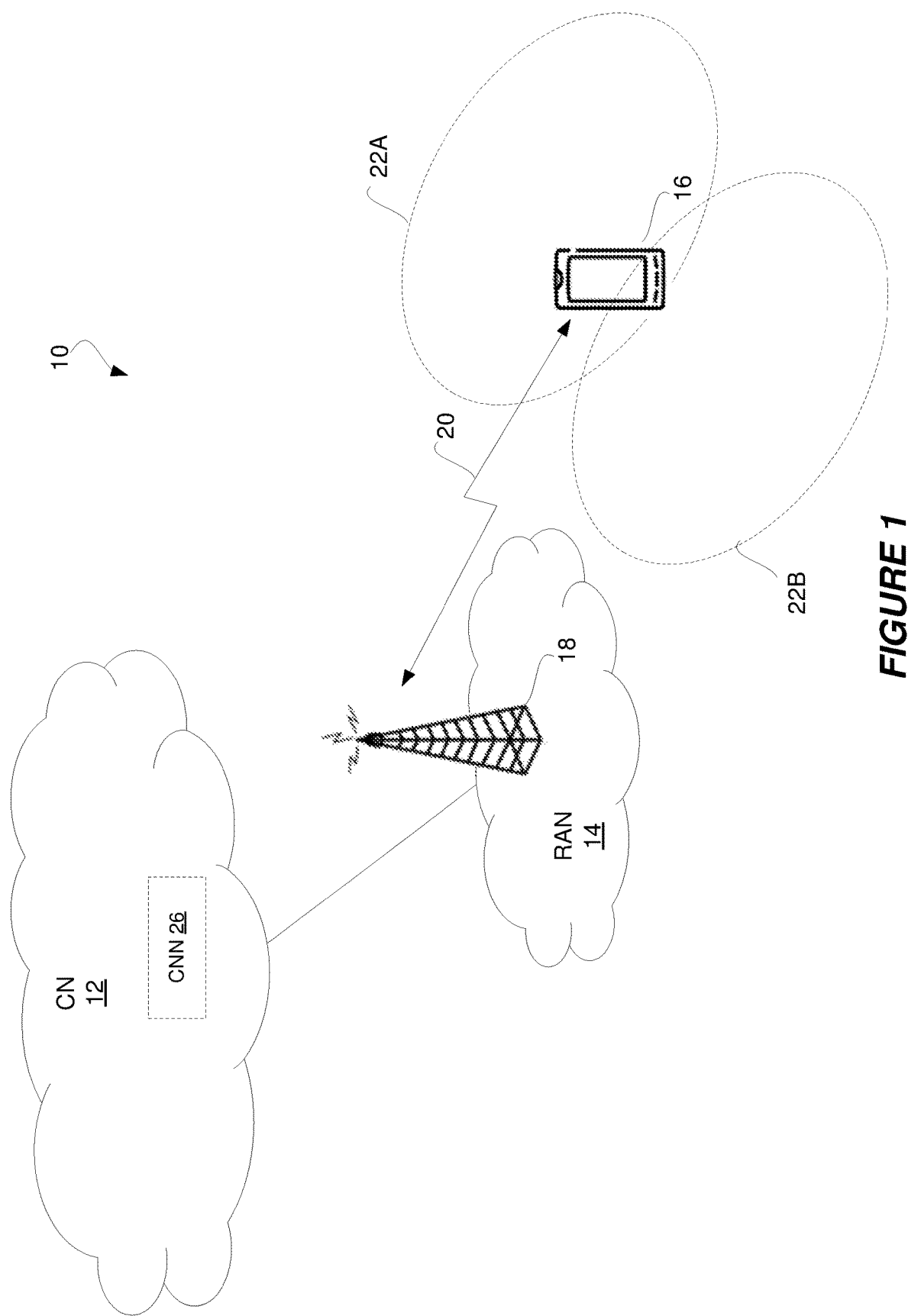
FIG. 1 is a block diagram of a wireless communication system according to some embodiments.

FIG. 1 illustrates a wireless communication system 10 (e.g., a narrowband internet of things, NB-IoT, system) according to some embodiments. As shown, the system 10 includes a core network (CN) 12 and a radio access network (RAN) 14. The CN 12 connects one or more wireless communication devices 16 (or simply "wireless devices") to one or more external networks via the RAN 14. The one or more external networks may include for instance a public switched telephone network (PSTN) or a packet data network (PDN) such as the Internet.

The RAN 14 includes one or more radio network nodes 18 (e.g., base stations), one of which is shown. Each radio network node 18 transmits and/or receives radio signals 20 so as to provide radio coverage for the wireless communication device(s) 16. By way of this radio coverage, each radio network node 18 provides one or more cells 22 for radio access to the CN 12—two of which are shown as cells 22A and 22B.

A wireless device 16 according to some embodiments herein accesses a cell 22 of the system 10 (for uplink and/or downlink communication) with one of multiple different possible so-called coverage levels. These coverage levels may include for instance a normal coverage level as well as one or more enhanced coverage levels. In some examples, coverage enhancement (CE) may be utilized to improve wireless communication between a radio network node 18 and a wireless communication device 16, and may involve repetition of transmissions of a data block over a channel in the time and/or frequency domain, power boosting for transmissions over an uplink or downlink channel or sub-carrier, channel subcarrier selection, and/or any other technique for improving communication quality. In some examples, such as those that may be implemented in a NB-IoT wireless communication system, each wireless communication device 16 in the wireless communication system 10 may have an associated CE level, which may be a factor in determining a number of transmission repetitions that are to be conducted for uplink transmissions from (or downlink communications to) the wireless communication device. In some examples, the CE level may correspond to a number or range of repetitions, a value (or value range) for a desired or realized gain of one or more transmitted or received signals, a transmission power or transmission power range associated with a device, or any other parameter that may be altered to tune communications to a particular quality level or range.

In some embodiments, different coverage levels correspond to different signal strength or signal quality measurement ranges. For example, in one embodiment, a wireless device 16 may perform a signal quality measurement (e.g., signal-to-noise-plus-interference ratio, SINR, measurement) on a particular signal or channel (e.g., a synchronization channel) from a cell. If the signal quality measurement falls within a first range (e.g., greater than or equal to 6 dB), the device 16 may operate under a normal coverage level with respect to that cell, whereas if the measurement falls within a second range (e.g., between −15 and −6 dB), the device 16 may operate under an enhanced coverage level with respect to that cell. Accordingly, if measurements of the quality of signals received from different cells fall within different ranges, the wireless device 16 may have or operate with different coverage levels with respect to the different cells.

The system 10 occasionally or periodically evaluates whether a cell change should be performed for a wireless device 18. Examples of a cell change include for instance cell reselection, handover, radio resource control (RRC) connection release with redirection, RRC connection re-establishment, etc. A cell change may for example mean that a wireless device 18 changes which cell 22 it camps on or is served by, e.g., from a first cell 22A to a second cell 22B.

Figure 2:
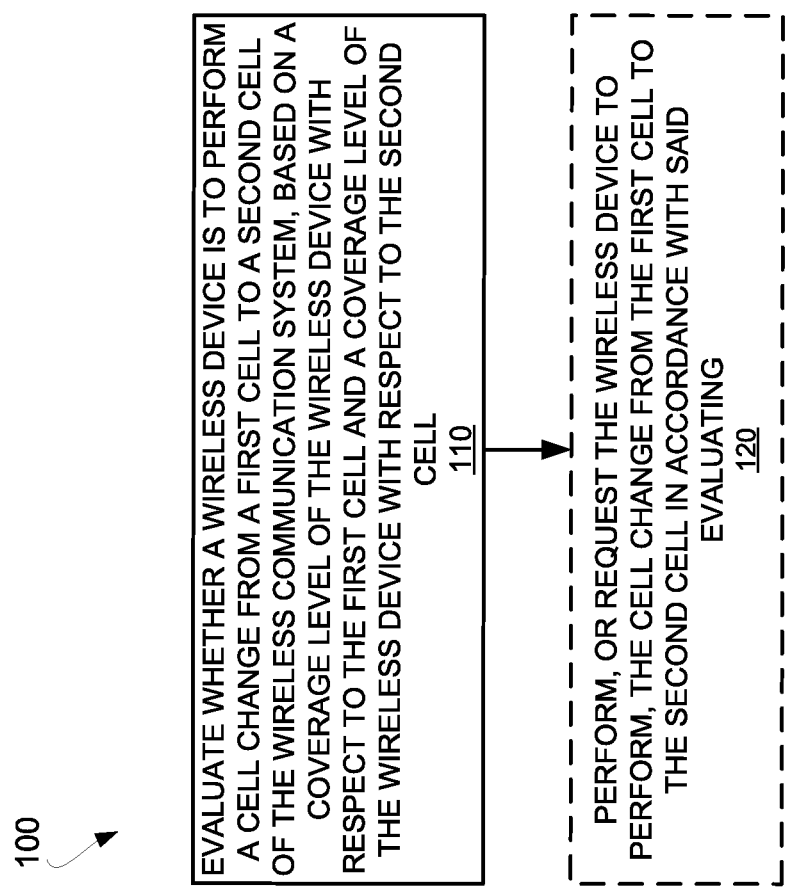
FIG. 2 is a logic flow diagram of a method performed in the wireless communication system according to some embodiments.

One or more embodiments herein evaluate whether a wireless device 16 is to perform a cell change, in a way that accounts for the fact that different cells 22 may be accessible by the wireless device 16 with different coverage levels, i.e., that the wireless device 16 may have different coverage levels with respect to different cells 22. FIG. 2 illustrates a method 100 performed in the wireless communication system 10 according to some embodiments in this regard. The method 100 may be performed by any node in the system 10, including for instance a wireless device 16, a radio network node 18, or a core network node 26. In any event, the method 100 includes evaluating whether a wireless device 16 is to perform a cell change from a first cell 22A to a second cell 22B of the wireless communication system 10, based on a coverage level of the wireless device 16 with respect to the first cell 22A and a coverage level of the wireless device 16 with respect to the second cell 22B (Block 110). The method in some embodiments may also include performing, or requesting the wireless device 16 to perform, the cell change from the first cell 22A to the second cell 22B in accordance with that evaluating (Block 120). Evaluating whether the wireless device 16 is to perform the cell change based on the coverage levels of the device 16 with respect to the cells may advantageously prevent the device 16 from performing a cell change to a less suitable cell, e.g., due to measurement bias.

In some embodiments, for example, the method 100 comprises ranking the first cell 22A and the second cell 22B according to one or more defined cell-ranking criteria (e.g., based on reference signal received power, RSRP, measurements of the cells 22A, 22B). In this case, evaluating whether the wireless device 16 is to perform a cell change from the first cell 22A to the second cell 22B may involve evaluating whether the second cell 22B is ranked better than the first cell 22A by at least a margin. In some embodiments, the margin (i.e., the value of the margin) may be based on or otherwise depend on the coverage level of the wireless device 16 with respect to the first cell 22A and the coverage level of the wireless device 16 with respect to the second cell 22B.

Figures 3A, 3B:
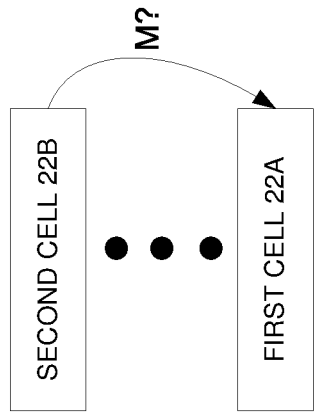
FIG. 3A is a block diagram depicting a ranking of cells according to some embodiments.
FIG. 3B is a table showing different possible combinations of coverage levels of a wireless device with respect to different cells, according to some embodiments.

FIGS. 3A-3B illustrate one example of embodiments involving cell ranking. As shown in FIG. 3A, the second cell 22B is ranked above (i.e., better than) the first cell 22A. In some embodiments, it is evaluated by how much the second cell 22B is ranked above the first cell 22A, e.g., in terms of the cell-ranking criteria. If the second cell 22B is ranked better than the first cell 22A by at least a margin M, the decision may be made to perform a cell change from the first cell 22A to the second cell 22B (e.g., if any other criterion for the cell change is met also).

Notably, the margin M (i.e., the value of M) may be based on or otherwise depend on the coverage level of the wireless device 16 with respect to the first cell 22A and the coverage level of the wireless device 16 with respect to the second cell 22B. In fact, the margin M may be based on or otherwise depend on how the coverage level of the wireless device 16 with respect to the first cell 22A is related to the coverage level of the wireless device 16 with respect to the second cell 22B (e.g., whether the coverage level of the wireless device 16 with respect to the first cell 22A is above, below, or the same as the coverage level of the wireless device 16 with respect to the second cell 22B). In these and other embodiments, then, different possible values of the margin M may be defined (e.g., in a table) for different possible combinations of (i.e., relationships between) the coverage level of the wireless device 16 with respect to the first cell 22A and the coverage level of the wireless device 16 with respect to the second cell 22B. FIG. 3B illustrates one example in this regard.

As shown in FIG. 3B, if both the first and second cells 22A, 22B are accessible by the wireless device 16 with a second coverage level (e.g., an enhanced coverage level), the margin M may have a value equal to M1. On the other hand, if the first cell 22A is accessible by the wireless device 16 with the second coverage level, whereas the second cell 22B is accessible by the wireless device with a first coverage level (e.g., a normal coverage level), the margin M may have a value equal to M2. Finally, if both the first and second cells 22A, 22B are accessible by the wireless device 16 with the first coverage level, the margin M may have a value equal to M3. FIG. 3B in some embodiments thereby represents a defined table that maps different possible relations between (e.g., combinations of) the respective coverage levels with which the first and second cells 22A, 22B are accessible by the wireless device 16 to different possible margins M1-M3. Note that, in some embodiments, at least some of the possible values M1, M2, and M3 are equal. For example, in some embodiments M1=M2=11 dB and M3=7 dB.

In one or more embodiments, the second coverage level in FIG. 3B is an enhanced coverage level that is applicable when a signal strength or signal quality measurement by a wireless device 16 falls within a certain range, whereas the first coverage level is a normal coverage level that is applicable when the measurement falls within a different range. For example, in one NB-IoT embodiment, the second coverage level is applicable when a narrowband synchronization channel (NSC) $\hat{E}s/Iot$ measurement Q falls within the range of $-15$ dB$\leq Q < 6$ dB, whereas the first coverage level is applicable when that measurement Q falls within the range of $Q \geq 6$ dB. Here, $\hat{E}s$ is the received energy per resource element (power normalized to the subcarrier spacing) during a useful part of a symbol, i.e., excluding any cyclic prefix, at an antenna connector of the wireless device 16. And Iot is the received power spectral density of the total noise and interference for a certain resource element (power integrated over the resource element and normalized to the subcarrier spacing) as measured at the antenna connector. In general, though, different coverage levels may correspond to different signal strength or signal quality measurement ranges.

Note that signal measurements corresponding to different coverage levels may have different levels of performance or inaccuracy. In this regard, measurement inaccuracy levels may be defined in terms of the magnitudes of absolute reference signal received power accuracy levels, or the magnitudes of relative reference signal received power accuracy levels of the first and second cells.

In these and other embodiments, the margin may comprises a maximum between measurement inaccuracy levels defined for the respective coverage levels of the wireless device 16 with respect to the first and second cells 22A, 22B. With the margin defined in this way (i.e., variable in dependence on coverage level), the margin may effectively ensure that any measurement inaccuracy attributable to coverage enhancement does not jeopardize the integrity of the cell change decision. For example, the margin guards against such measurement inaccuracy causing one of the cells 22A, 22B to look more suitable than it actually is in the cell change decision.

In view of the above, FIG. 4 generally illustrates a method according to some embodiments herein where the cell change comprises cell reselection. As shown, the method 200 may include ranking a first cell 22A and a second cell 22B of the wireless communication system 10 according to one or more defined cell-ranking criteria (Block 210). The method 200 also includes evaluating that the second cell 22B has met a reselection criterion for a wireless device 16, provided that the second cell 22B is ranked better than the first cell 22A by at least a margin (Block 220).

As described above, the value of the margin in some embodiments depends on the coverage level of the wireless device 16 with respect to the first cell 22A and the coverage level of the wireless device 16 with respect to the second cell 22B. In fact, the margin may be based on or otherwise depend on how the coverage level of the wireless device 16 with respect to the first cell 22A is related to the coverage level of the wireless device 16 with respect to the second cell 22B (e.g., whether the coverage level of the wireless device 16 with respect to the first cell 22A is above, below, or the same as the coverage level of the wireless device 16 with respect to the second cell 22B). Accordingly, the margin may have one of multiple different values defined as possible for the margin, i.e., the margin's value is variable rather than fixed.

Stated another way, the value of the margin in some embodiments depends on respective coverage levels with which the first and second cells 22A, 22B are accessible by the wireless device 16. Alternatively or additionally, the value of the margin is specified by a table (e.g., as in FIG. 3B) that maps different possible relations between (i.e., combinations of) the respective coverage levels with which the first and second cells 22A, 22B are accessible by the wireless device 16 to different possible values of the margin (e.g., M1-M3).

Figure 5:
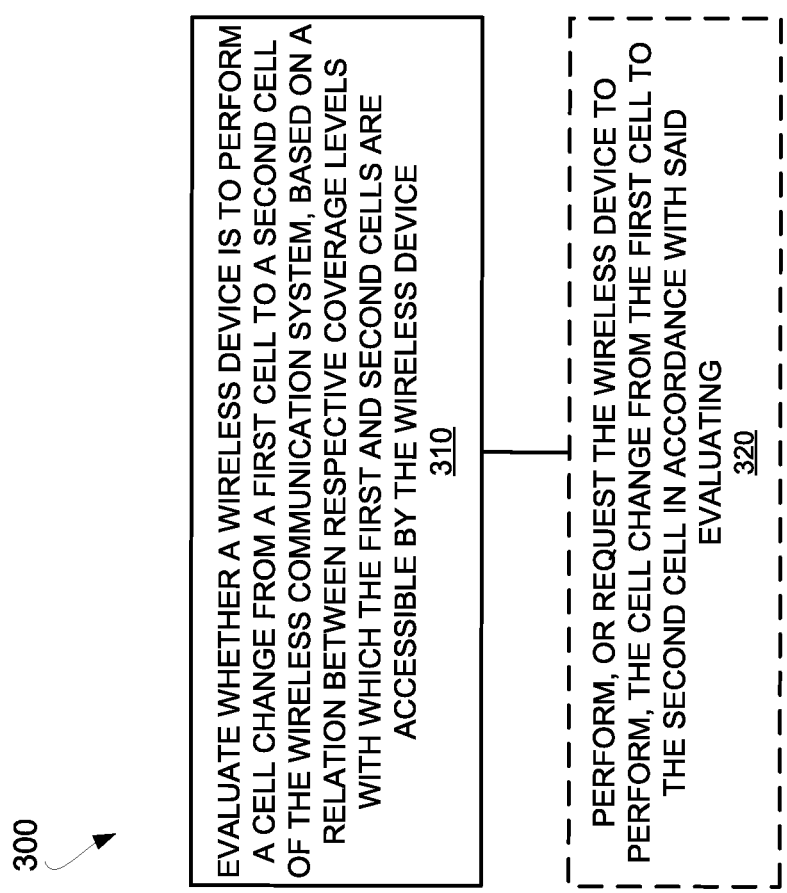
FIG. 5 is a logic flow diagram of a method performed in the wireless communication system according to still other embodiments.

Stated in this way in terms of the relation between coverage levels, FIG. 5 illustrates a method 300 performed in the wireless communication system 10 according to some embodiments in this regard. The method 300 may be performed by any node in the system 10, including for instance a wireless device 16, a radio network node 18, or a core network node 26. In any event, the method 300 includes evaluating whether a wireless device 16 is to perform a cell change from a first cell 22A to a second cell 22B of the wireless communication system 10, based on a relation between respective coverage levels with which the first and second cells 22A, 22B are accessible by the wireless device 16 (Block 310). The method 300 in some embodiments may also include performing, or requesting the wireless device 16 to perform, the cell change from the first cell 22A to the second cell 22B in accordance with that evaluating (Block 320).

In some embodiments, for example, the method 300 comprises ranking the first cell 22A and the second cell 22B according to one or more defined cell-ranking criteria. In this case, evaluation may involve evaluating the ranking based on the relation between respective coverage levels with which the first and second cells 22A, 22B are accessible by the wireless device 16. As one particular example in this regard, this may involve evaluating whether the second cell 22B is ranked better than the first cell 22A by at least a margin, where the margin is based on that relation.

The margin M (i.e., the value of M) may be based on or otherwise depend on the relation between respective coverage levels with which the first and second cells 22A, 22B are accessible by the wireless device 16. For example, the margin M may have one of multiple possible values defined respectively for different possible relations between respective coverage levels with which the first and second cells 22A, 22B are accessible by the wireless device 16.

Figure 6:
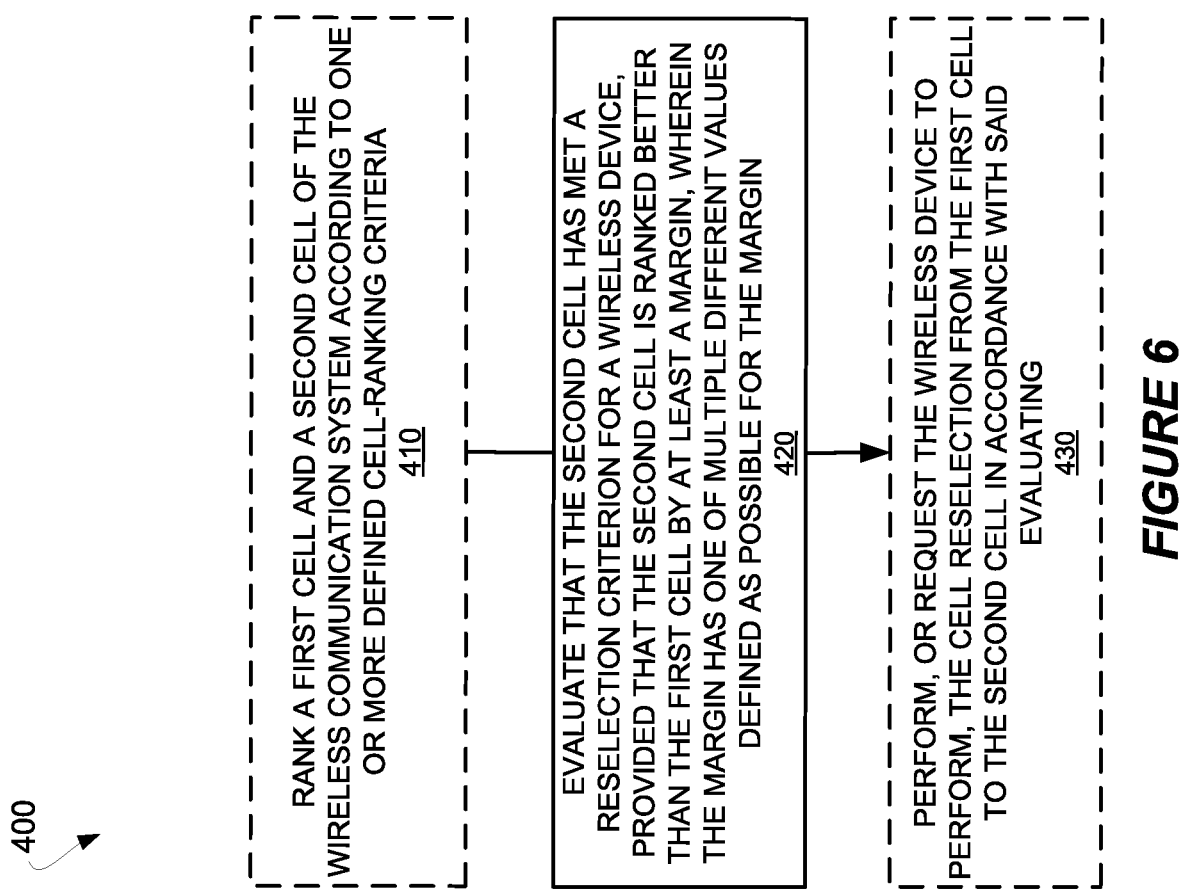
FIG. 6 is a logic flow diagram of a method performed in the wireless communication system according to yet other embodiments.

FIG. 6 correspondingly illustrates a method according to some embodiments herein where the cell change comprises cell reselection. As shown, the method 400 may include ranking a first cell 22A and a second cell 22B of the wireless communication system 10 according to one or more defined cell-ranking criteria (Block 410). The method 400 also includes evaluating that the second cell 22B has met a reselection criterion for a wireless device 16, provided that the second cell 22B is ranked better than the first cell 22A by at least a margin (Block 420). The margin may have one of multiple different values defined as possible for the margin, i.e., the margin's value is variable rather than fixed.

In some embodiments, e.g., as described above, the value of the margin depends on respective coverage levels with which the first and second cells are accessible by the wireless device. Alternatively or additionally, the value of the margin is specified by a table (e.g., as in FIG. 3B) that maps different possible relations between the respective coverage levels with which the first and second cells are accessible by the wireless device to different possible values of the margin (e.g., M1-M3).

The method 400 in some embodiments may also include performing, or requesting the wireless device 16 to perform, the cell change from the first cell 22A to the second cell 22B in accordance with that evaluating (Block 430).

Note that FIG. 3B and any other information indicating the possible margin values M1-M3 may be transmitted amongst nodes in the system, e.g., to facilitate cell ranking evaluation as described herein.

Figure 7:
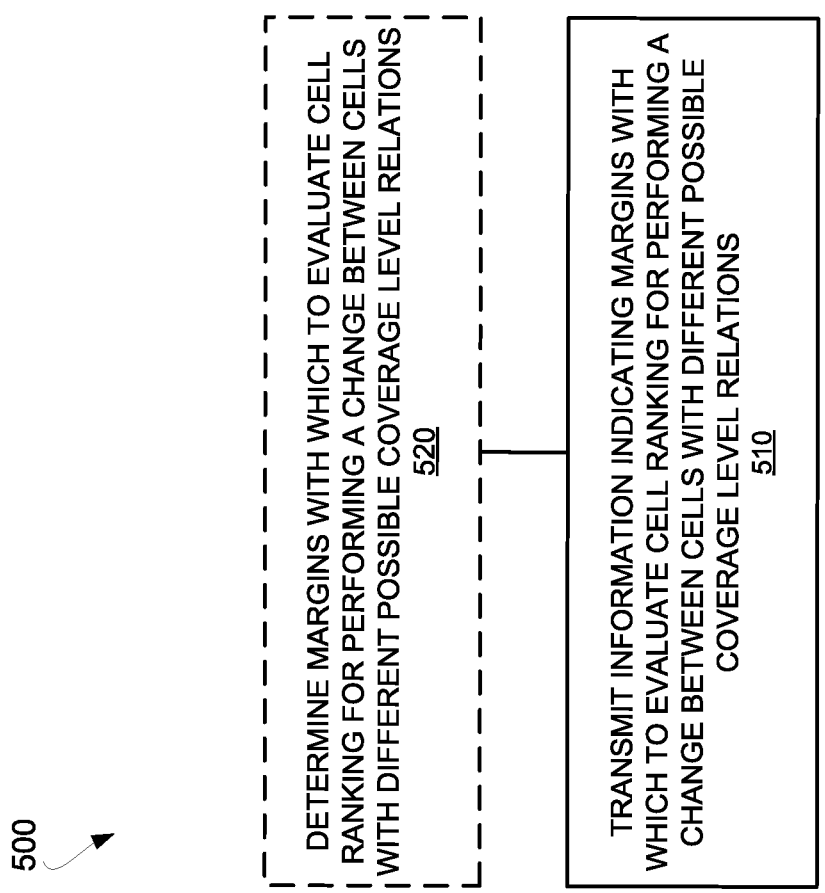
FIG. 7 is a logic flow diagram of a method performed in the wireless communication system according to still other embodiments.

In this regard, FIG. 7 illustrates a method 500 performed by a wireless device 16 configured for use in a wireless communication system 10 according to some embodiments. As shown, the method 500 includes transmitting information indicating margins with which to evaluate cell ranking for performing a change between cells with different possible coverage level relations (Block 510). The method 500 may also include determining those margins (Block 520).

One or more embodiments will now be described in certain contexts, e.g., with reference to Narrow Band Internet of Things (NB-IoT) and/or Long Term Evolution (LTE).

The Narrow Band Internet of Things (NB-IOT) is a radio access for cellular internet of things (IOT), based to a great extent on a non-backward-compatible variant of E-UTRA, that addresses improved indoor coverage, support for massive number of low throughput devices, low delay sensitivity, ultra-low device cost, low device power consumption and (optimized) network architecture. The NB-IOT carrier bandwidth (BW) is 200 KHz. Examples of operating bandwidth of LTE are 1.4 MHz, 3 MHz, 5 MHz, 10 MHz, 15 MHz, 20 MHz etc.

NB-IoT supports 3 different deployment scenarios.

'Stand-alone operation' utilizes for example the spectrum currently being used by GERAN (Global System for Mobile communications (GSM) Enhanced Data rates for GSM Evolution (EDGE) Radio Access Network) systems as a replacement of one or more GSM carriers. In principle it operates on any carrier frequency which is neither within the carrier of another system nor within the guard band of another system's operating carrier. The other system can be another NB-IOT operation or any other radio access technology (RAT) e.g. LTE.

'Guard band operation' utilizes the unused resource blocks within an LTE carrier's guard-band. The term guard band may also be interchangeably referred to as guard bandwidth. As an example, in case of LTE BW of 20 MHz (i.e. Bw1=20 MHz or 100 RBs), the guard band operation of NB-IOT can placed anywhere outside the central 18 MHz but within 20 MHz LTE BW.

'In-band operation' utilizes resource blocks within a normal LTE carrier. The in-band operation may also interchangeably be called in-bandwidth operation. More generally, the operation of one RAT within the BW of another RAT is also called as in-band operation. As an example in a LTE BW of 50 RBs (i.e. Bw1=10 MHz or 50 RBs), NB-IOT operation over one resource block (RB) within the 50 RBs is called in-band operation.

In NB-IOT, the downlink transmission is based on orthogonal frequency division multiplexing (OFDM) with 15 kHz subcarrier spacing and the same symbol and cyclic prefix durations as for legacy LTE for all the scenarios: standalone, guard-band, and in-band. For uplink (UL) transmission, both multi-tone transmissions based with a 15 kHz subcarrier spacing on Single Carrier Frequency Division Multiple Access (SC-FDMA), and single tone transmission, with either 3.75 kHz or 15 kHz subcarrier spacing, is supported.

Downlink transmission is based on OFDM with 15 kHz sub-carrier spacing. Uplink transmission is based on SC-FDMA, supporting single tone or multi-tone (3, 6 or 12 tones) transmissions.

In the frequency division duplexing (FDD) configuration of LTE, DL subframe #0 and subframe #5 carry synchronization signals (i.e. both primary synchronization signal, PSS, and secondary synchronization signal, SSS). In time division duplexing (TDD) configurations, the two pairs of synchronization signals per radio frame are carried by subframes 0 and 1, and 5 and 6, respectively. For the ease of presentation, only the FDD configuration will be discussed here. There are however no significant differences regarding cell search in FDD and TDD systems, hence the description can easily be adapted to TDD scenarios.

In order to identify an unknown cell (e.g. new neighbor cell) a user equipment (UE) has to acquire the timing of that cell and eventually the physical cell ID (PCI). Subsequently the UE also measures reference symbol received power (RSRP) and/or reference symbol received quality (RSRQ) of the newly identified cell in order to use by itself (in case of UE-controlled mobility in idle mode) and/or report the measurement to the network node. In total there are 504 PCIs.

Therefore the UE searches or identifies a cell (i.e. acquire PCI of the cell) by correlating the received PSS/SSS signals in DL subframe #0 and/or in DL subframe #5 with one or more of the pre-defined PSS/SSS sequences. The use of subframe #0 and/or in DL subframe #5 for PCI acquisition depends upon the UE implementation. The UE regularly attempts to identify neighbor cells on at least the serving carrier frequenc(ies). But it may also search cells on non-serving carrier(s) when configured by the network node to do so. In order to minimize UE power consumption, typically the UE searches in one of the DL subframes that carries synchronization signals, i.e., #0 or #5. In order to further save its battery power the UE searches for newly detectable neighbor cells on the intra-frequency carrier once every 40 ms in non-DRX or in short DRX cycle (e.g. up to 40 ms), where DRX refers to discontinuous reception. In a longer DRX cycle the UE typically searches for newly detectable neighbor cells once every DRX cycle. During each search attempt the UE typically stores a snapshot of radio samples of 5-6 ms and post processes those samples by correlating the stored signals with the known PSS/SSS sequences. The reason for acquiring 5-6 ms of radio samples is that in case the neighbor cell(s) are not synchronous to the serving cell, the UE does not know where exactly to find the synchronization signal, but knows that there will be one such signal transmitted every 5 ms. In non-DRX the UE is able to identify an intra-frequency cell (including RSRS/RSRQ measurements) within 800 ms (i.e. 20 attempts in total including 15 and 5 samples, respectively, for cell identification (PCI acquisition) and RSRP/RSRQ measurement).

Radio measurements done by the UE are typically performed on the serving as well as on neighbor cells over some known reference symbols or pilot sequences. The measurements are done on cells on an intra-frequency carrier, inter-frequency carrier(s) as well as on inter-RAT carriers(s) (depending upon the UE capability whether it supports that RAT). To enable inter-frequency and inter-RAT measurements for the UE requiring gaps, the network has to configure the measurement gaps.

The measurements are done for various purposes. Some example measurement purposes are: mobility, positioning, self-organizing network (SON), minimization of drive tests (MDT), operation and maintenance (O&M), network planning and optimization etc. Examples of measurements in LTE are Cell identification aka PCI acquisition, Reference Symbol Received Power (RSRP), Reference Symbol Received Quality (RSRQ), NRSRP, NRSRQ, S-RSRP, RS-SINR, Channel State Information Reference Symbol Received Power (CSI-RSRP), acquisition of system information (SI), cell global ID (CGI) acquisition, Reference Signal Time Difference (RSTD), UE RX-TX time difference measurement, Radio Link Monitoring (RLM), which consists of Out of Synchronization (out of sync) detection and In Synchronization (in-sync) detection etc. CSI measurements performed by the UE are used for scheduling, link adaptation etc. by network. Examples of CSI measurements or CSI reports are CQI, PMI, RI etc. They may be performed on reference signals like Cell-specific Reference Signal (CRS), CSI-RS or Demodulation Reference Signal (DMRS).

The measurements may be unidirectional (e.g., DL or UL) or bidirectional (e.g., having UL and DL components such as Rx-Tx, round trip time (RTT), etc).

The DL subframe #0 and subframe #5 carry synchronization signals (i.e. both PSS and SSS). In order to identify an unknown cell (e.g. new neighbor cell) the UE has to acquire the timing of that cell and eventually the physical cell ID (PCI). This is referred to as cell search or cell identification or even cell detection. Subsequently the UE also measures RSRP and/or RSRQ of the newly identified cell in order to use itself and/or report the measurement to the network node. In total there are 504 PCIs. The cell search is also a type of measurement.

The measurements are done in all radio resource control (RRC) states, i.e. in RRC idle and RRC connected states.

With this understanding, a UE is served by a serving cell which has already been identified by the UE. The UE further identifies at least one another cell, which may be called a target cell or neighbor cell. In some embodiments the serving cell and neighbor cell are served or managed by a first network node and a second network node, respectively. In some embodiments the serving cell and neighbor cell are served or managed by the same network node e.g. a first network node.

Some embodiments are applicable for a UE in a low or in high activity state. Examples of low activity state are RRC idle state, idle mode etc. Examples of low activity state are RRC CONNECTED state, active mode, active state etc. The UE may be configured to operate in DRX or in non-DRX. If configured to operate in DRX, it may still operate according to non-DRX as long as it receives new transmissions from the network node.

The UE may operate under either normal coverage or enhanced coverage with respect to its serving cell. The enhanced coverage is also interchangeably called extended coverage. The UE may also operate in a plurality of coverage levels e.g. normal coverage, enhanced coverage level 1, enhanced coverage level 2, enhanced coverage level 3 and so on, e.g., with respect to different cells.

The normal and extended coverage operations may typically take place on narrower UE radio frequency (RF) bandwidth compared with the system bandwidth aka cell BW, cell transmission BW, DL system BW etc. In some embodiments the UE RF BW can be the same as of the system bandwidth. Examples of narrow RF BWs are 200 KHz, 1.4 MHz etc. Examples of system BW are 200 KHz, 1.4 MHz, 3 MHz, 5 MHz, 10, MHz, 15 MHz, 20 MHz etc. In case of extended/enhanced coverage, the UE may be capable of operating under lower signal quality level (e.g. SNR, SINR, ratio of average received signal energy per subcarrier to total received power per subcarrier ($\hat{E}s/Iot$)), RSRQ etc) compared to its capabilities when operating in a legacy systems. The coverage level enhancement may vary with the operational scenario and may also depend on the UE type. For example, a UE which is located in a basement with bad coverage may need larger level of coverage enhancement (e.g. 10 dB) compared to a UE which is at a cell border (e.g. 5 dB).

The coverage level may be expressed in terms of received signal quality and/or received signal strength at the UE with respect to its serving cell and/or received signal quality and/or received signal strength at the serving cell with respect to the UE.

Examples of signal quality are signal-to-noise ratio (SNR), signal-to-interference-plus-noise ratio (SINR), channel quality information (CQI), RSRQ, CRS $\hat{E}s/Iot$, SCH $\hat{E}s/Iot$ etc. Examples of signal strength are path loss, RSRP, SCH_RP etc. The notation $\hat{E}s/Iot$ is defined as a ratio of $\hat{E}s$ to $Iot$, where $\hat{E}s$ is the received energy per RE (power normalized to the subcarrier spacing) during the useful part of the symbol, i.e. excluding the cyclic prefix, at the UE antenna connector, and where Iot is the received power spectral density of the total noise and interference for a certain RE (power integrated over the RE and normalized to the subcarrier spacing) as measured at the UE antenna connector.

Consider an example of 2 coverage levels defined with respect to signal quality (e.g. SNR) at the UE comprising of: Coverage enhancement level 1 (CE1) comprising of SNR≥−6 dB at UE with respect its serving cell; and Coverage enhancement level 2 (CE2) comprising of −12 dB≤SNR<−6 dB at UE with respect to its serving cell.

Consider another example of 4 coverage levels comprising of: Coverage enhancement level 1 (CE1) comprising of SNR≥−6 dB at UE wrt its serving cell; Coverage enhancement level 2 (CE2) comprising of −12≤dB SNR<−6 dB at UE wrt its serving cell; Coverage enhancement level 3 (CE3) comprising of −15≤dB SNR<−12 dB at UE wrt its serving cell; and Coverage enhancement level 4 (CE4) comprising of −18 dB≤SNR<−15 dB at UE wrt its serving cell.

In the above example, CE1 may also be interchangeably called as normal coverage level, baseline coverage level, reference coverage level, legacy coverage level, or the like. On the other hand, CE2-CE4 may be termed as enhanced coverage or extended coverage level.

A problem arises if a cell change does not take into account the different coverage level of the different cells that the UE can reselect to. Consider an example in which a UE does cell change from one cell to another cell which belong to the same coverage level (e.g. normal coverage or enhanced coverage etc.) and the target cell has to be at least 3 dB (the relative RSRP accuracy level) better than the reference cell. The problem is that since the coverage level of the reference cell (e.g. serving cell) and the target cell could be different, the performed measurement (e.g. RSRP/RSRQ) will also result in different measurement performance (e.g. accuracies). If this difference is not taken into account in the cell change procedure, this may result in that cells which are less suitable, or not suitable for cell change, are being reselected. In addition, even within the same coverage level, for example within enhanced coverage level, there could be large variance in the measurement performance. It can cause bad performance for the UE but also for the network since the network can be required to use more resources to support this UE than what is really necessary.

Some embodiments herein therefore include a method in a UE of adapting its cell change procedure. For example, a method in a UE served by a first network node comprises of the following steps: Step 1: determining the coverage level (e.g. using signal quality measurement level (Q1)) of at least a first cell (cell1) which is the reference cell, e.g. a serving cell; Step 2: determining the coverage level (e.g. using a signal quality measurement level (Q2)) of at least a second cell (cell2), which is the target cell; Step 3: Determining the relation between determined coverage levels of the two cells based on performed measurement of cell1 and cell2; and Step 4: Based on relation, UE performs the cell change from cell1 to cell2 provided that a certain condition on the measurement levels is met.

One or more advantages of these embodiments include: (i) enables cell change between different cells of different level of coverage enhancement; (ii) enables that the radio resources in the network are used efficiently but configuring the UEs to operate in the cells which are most suitable based on the UE experience These steps are described in more detail below. In Step 1, UE performs one or more measurements on one or more signals received from the reference cell, aka cell1 (e.g. serving cell). For example, the UE may determine the signal strength and/or qualities of all the already identified cells. In one example, cell1 is a serving cell. In another example, cell1 is a non-serving cell. The measurement(s) may be performed periodically or when a certain condition is met (e.g. when certain timer expires, when signal quality of another cell falls below a threshold).

The result of the measurement is denoted as X1. As an example, X1 is based the measured absolute NRSRP level or relative NRSRP level. Although the principle is exemplified using NRSRP measurement in this embodiment, the same principles can be used for other type of measurements such as RSRQ, RS-SINR, SINR, SNR, SCH $\hat{E}s/Iot$, CRS $\hat{E}s/Iot$ CSI-RS $\hat{E}s/Iot$ etc. If it is an NRSRP measurement it may result in X dBm, e.g. −110 dBm, −90 dBm etc.

Regarding Step 2, the aspects described for Step 1 also apply to Step 2, with the only difference that the measurements are performed on the target cell instead of the reference cell. Here the result measurement of the target cell is denoted as X2.

In Step 3, the UE determines the relation between performed measurement (X1) of the reference cell and the target cell measurement (X2). The triggering of cell change operation (Cg) from cell1 to cell2 may be based on the outcome of the relation between X1 and X2. The said relation for determining whether to perform cell change or not can be expressed using a general function (F) as follows: $P=F(X1, X2, M, \mu)$, where M is a margin that depends on the operating scenario such as coverage enhancement level, deployment mode, etc., and μ is UE implementation margin (as special case μ can be negligible).

This embodiment allows the UE to perform a cell change from the reference cell (cell1) to a target cell (cell2) provided that the function F is met. One specific realization or example of such function F is that the cell change is performed by the UE only if: X2>X1+M, where M is expressed by the following relation or functions: M=F1(M1, M2). As shown, M may depend on M1 and M2, where M1 and M2 are the margins associated with the measurement performed on cell1 and cell2 respectively. The margins may depend on the measurement error or measurement bias (i.e. the difference between the measured value and the theoretical/ideal value) of the measurement. In order to ensure minimum performance of measurement, RAN4 specifies a requirement on measurement accuracy which specifies the maximum measurement accuracy level. Examples of functions (F or F1) are maximum, average, minimum, xth percentile etc.

Typically, the cell change is performed between the cells of same type coverage level, e.g. cells that support operation down to −6 db SNR level. Examples of cell change are cell reselection, handover, RRC connection release with redirection, RRC connection re-establishment etc. Under enhanced coverage operation, though, the cells could be in different coverage level which gives rise to different cell change scenarios/combinations as shown in Table 1 of FIG. 8.

As an example, the cell change criteria in Table 1 depends on α1 and α2 which correspond to the magnitude of the absolute NRSRP accuracy levels of cell1 and cell2 respectively. FIG. 2 shows Table 2 as depicting the NRSRP measurement accuracy levels as currently specified in the 3GPP specification. As shown, the actual accuracy levels are to be decided (TBD).

The performed NRSRP measurement will result in different accuracy levels for the different cells. As per the cell change criteria in Table 1, a UE is to perform the cell change from cell1 to cell2 based on the maximum inaccuracy of the two NRSRP measurements.

In a first example, it is assumed that UE is under enhanced coverage with respect to both the reference cell and the target cell. The magnitude of the measured absolute NRSRP measurement accuracy of reference cell is a1 and magnitude of the measured absolute NRSRP level of target cell is α2. In this case, it is assumed that the magnitude of the absolute NRSRP accuracy level of cell1 is larger than magnitude of the absolute NRSRP accuracy level of cell2, i.e. α1>α2. Thus the cell change is triggered only if measured NRSRP level of cell2 is at least α1 dB stronger than that of cell1 since Max(α1, α2)=α1.

In a second example, it is assumed that the absolute NRSRP measurement accuracy of cell2 is larger than that of cell1 i.e. α2>α1. In this case, the cell change is triggered only if measured NRSRP level of cell2 is at least α2 dB stronger than that of cell1.

FIG. 10 shows yet another example in Table 3 where the UE may change from a serving cell (cell1) that has an absolute NRSRP measurement accuracy of a1 to a target cell (cell2) that has an absolute NRSRP measurement accuracy of α2.

Irrespective of which cell (serving or target) has which coverage level, typical absolute measurement accuracy levels of enhanced coverage cells and normal coverage cells are +/−11 dB and +/−7 dB respectively. The magnitude of typical absolute measurement accuracy levels of enhanced coverage cells and normal coverage cells are 11 dB and 7 dB respectively. In this case, the cell change between the normal coverage cell (e.g. current serving cell) and the enhanced coverage cell (e.g. target cell) is triggered only if the measured NRSRP level of the target cell is at least 11 dB stronger than that of the current serving cell.

One advantage of performing the cell change based on the criteria mentioned in Table 1 is that it accounts for the measurement bias, i.e. the margin in measurement level for cell change criteria has to be larger than the measurement bias, i.e. the margin used to trigger the cell change is based on the maximum inaccuracy level of the two measurements performed. Otherwise there is large risk that UE performs cell change to a less suitable cell that may e.g. consume too much radio resources in terms of repetition level, aggregation level etc.

Furthermore, UE may alternatively or additionally base the cell change criteria on the relative NRSRP measurement accuracy levels of the different cells. In this case, the corresponding tables become a function of the magnitude of the relative measurement accuracies as shown in Table 4 and 5 in FIGS. 11 and 12. Typical values of β1 and β2 are +/−5 dB and +/−4 dB for enhanced and normal coverage respectively. That is the magnitude of the typical values of β1 and β2 are 5 dB and 4 dB for enhanced and normal coverage respectively. In yet another example, the condition used for determining the cell change may depend on both the magnitude of the absolute accuracy level and relative accuracy level as shown in Table 6 in FIG. 13. This may further improve the selection by ensuring that a more suitable cell is selected compared to if condition is based on single measurement type.

In step 4, the UE carries out the cell change procedure provided that the cell change criteria described in earlier step (Step 3) is met.

Further embodiments include methods in a UE of signaling information related to cell identification procedure. This embodiment is related to transmitting the information related to margins used in determining whether to perform the cell change of cells of different coverage levels as described above to other nodes in the network. Examples of other nodes are other UEs, ProSe UEs, ProSe Relay UEs, eNodeB, base station, access point core network nodes, positioning node, or any other nodes used for dedicated services such as self-organizing network (SON) node.

There are significant advantages in sharing the information related to margin used for determining cell change of cells of different coverage levels with other nodes. For example, the same margins could be used to trigger cell change of two cells which are both operating under enhanced coverage. Deriving such information may be complex, and there could be a significant advantage of performing such complex tasks in one place and then sharing with other nodes.

In a second example, sharing this type of information with other SON nodes may bring some advantages. The SON node may use this information to activate, deactivate or adapt different procedures under enhanced coverage operation.

Still other embodiments include methods in a network node of adapting cell change procedure. The steps performed by the network node may include: Step 1: Obtaining the measurement level of the reference cell aka cell1 performed by the UE; Step 2: Obtaining the measurement level of the target cell aka cell2 performed by the UE; Step 3: Determining the relation between determined UE coverage levels with respect to the corresponding cells, cell1 and cell2, based on obtained measurement of cell1 and cell2 respectively; and Step 4: Based on relation, network node requests the UE to perform the cell change from cell1 to cell2 provided that a certain condition on the measurement levels is met.

These steps are explained more in detail below. In Step 1, the network node obtains the performed measurement corresponding to the reference cell, aka cell1. This can be obtained from e.g. periodical measurement reporting, event-triggered measurement reporting or event-triggered periodic measurement reporting. From the obtained measurement, the network node knows the value of X1 which corresponds to the measurement error of cell1.

In step 2, the description in step 1 also applies to Step 2, with the only difference that the measurements are those that are performed on the target cell aka cell2 instead of the reference cell.

In step 3, the determination of relation between X2 and X2 as described in step 3 of the UE embodiment above also applies here.

In Step 4, the network requests the UE to perform the cell change from cell1 to cell2 provided that the condition as described above is met. Examples of cell change that are requested by the network node is cell reselection, handover, RRC release with redirection. The said request can by performed using dedicated RRC signaling.

In view of the above, some embodiments herein may be realized with certain changes to 3GPP Technical Specification 36.133 v13.5.0. In particular, regarding measurements of intra-frequency NB-IoT cells for UE category NB1 in enhanced coverage, Section 4.6.2.4 of TS 36.133 may read as follows:

The UE shall be able to identify new intra-frequency cells and perform NRSRP measurements of identified intra-frequency cells without an explicit intra-frequency neighbour list containing physical layer cell identities.

The UE shall be able to evaluate whether a newly detectable intra-frequency cell meets the reselection criteria defined in TS36.304 within $T_{detect,NB\_Intra\_EC}$ when that Treselection=0. An intra frequency cell is considered to be detectable according to NRSRP, NRSRP Ês/Iot, NSCH_RP and NSCH Ês/Iot defined in Annex B.1.4 for a corresponding Band.

The UE shall measure NRSRP at least every $T_{measure,NB\_Intra\_EC}$ for intra-frequency cells that are identified and measured according to the measurement rules.

The UE shall filter NRSRP measurements of each measured intra-frequency cell using at least [2] measurements. Within the set of measurements used for the filtering, at least two measurements shall be spaced by at least $T_{measure,NB\_Intra\_EC}/2$.

The UE shall not consider a NB-IoT neighbour cell in cell reselection, if it is indicated as not allowed in the measurement control system information of the serving NB-IoT cell.

For an intra-frequency cell that has been already detected, but that has not been reselected to, the filtering shall be such that the UE shall be capable of evaluating that the intra-frequency cell has met reselection criterion defined [1] within $T_{evaluate,NB\_intra\_EC}$ when $T_{reselection}=0$, provided that the cell is at least M dB better ranked as specified in Table 4.6.2.4-3, When evaluating cells for reselection, the side conditions for NRSRP, NRSRP Ês/Iot, NSCH_RP and NSCH Ês/Iot apply to both serving and non-serving NB-IoT intra-frequency cells.

If $T_{reselection}$ timer has a non zero value and the intra-frequency cell is better ranked than the serving NB-IoT cell, the UE shall evaluate this intra-frequency cell for the $T_{reselection}$ time. If this cell remains better ranked within this duration, then the UE shall reselect that cell.

For UE not configured with eDRX_IDLE cycle, $T_{detect,NB\_Intra\_EC}$, $T_{measure,NB\_Intra\_EC}$ and $T_{evaluate,NB\_intra\_EC}$ are specified in Table 4.6.2.4-1 provided that additional conditions in Table 4.6.2.4-3 are met. For UE configured with eDRX_IDLE cycle, $T_{detect,NB\_Intra\_EC}$, $T_{measure,NB\_Intra\_EC}$ and $T_{evaluate,NB\_intra\_EC}$ are specified in Table 4.6.2.4-2, where the requirements apply provided that the serving NB-IoT cell is configured with eDRX_IDLE and is the same in all PTWs during any of $T_{detect,NB\_Intra\_EC}$, $T_{measure,NB\_Intra\_EC}$ and $T_{evaluate,NB\_intra\_EC}$ when multiple PTWs are used.

FIGS. 14A-14B show table 4.6.2.4-1, table 4.6.2.4-2, and table 4.6.2.4-3 according to some embodiments.

Note that a radio node herein is any type of node (e.g., a radio network node or wireless device) capable of communicating with another node over radio signals. A radio network node is any type of radio node within a wireless communication network, such as a base station. A radio network node can be any kind of a radio network node which may comprise any of base station, radio base station, base transceiver station, base station controller, network controller, RNC, evolved Node B (eNB), Node B, Multi-cell/multicast Coordination Entity (MCE), relay node, access point, radio access point, Remote Radio Unit (RRU) Remote Radio Head (RRH).

A network node is any type of node within a wireless communication network, whether a radio network node or not.

A wireless device is any type of radio node capable of communicating with a radio network node over radio signals. A wireless device may therefore refer to a user equipment (UE), a machine-to-machine (M2M) device, a machine-type communications (MTC) device, a NB-IoT device, etc. However it should be noted that the UE does not necessarily have a "user" in the sense of an individual person owning and/or operating the device. A wireless device may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but are generally configured to transmit and/or receive data without direct human interaction. The UE herein can therefore be any type of wireless device capable of communicating with a network node or another UE over radio signals. In some embodiments the UE may be configured with PCell and PSCell or with PCell, PSCell and one or more SCells such as in dual connectivity and/or carrier aggregation. The configured cells are UE specific aka serving cells of the UE.

In an internet of things (IoT) scenario, a wireless device as described herein may be, or may be comprised in, a machine or device that performs monitoring or measurements, and transmits the results of such monitoring measurements to another device or a network.

Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

Note that any node in the system may perform the method in FIGS. 2, 4, 5, 6 and/or 7 and any other processing herein by implementing any functional means or units. In one embodiment, for example, the node comprises respective circuits or circuitry configured to perform the steps shown in FIGS. 2, 4, 5, 6 and/or 7. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 15:
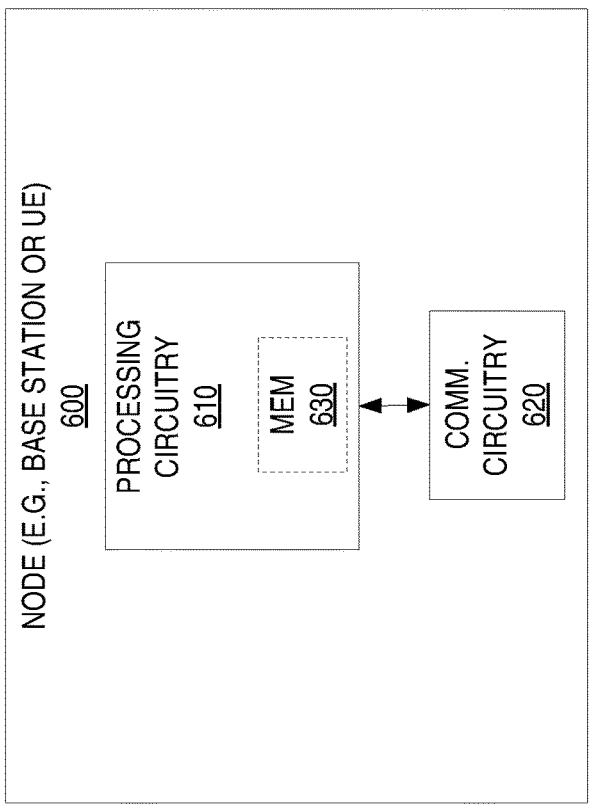
FIG. 15 is a block diagram of a node in a wireless communication system according to some embodiments.

FIG. 15 illustrates a node 600 implemented in accordance with one or more embodiments. The node 600 may be a radio network node 18, a wireless device 16 (e.g., a UE), or any other node in the system 10. As shown, the node 600 includes processing circuitry 610 and communication circuitry 620. The communication circuitry 620 is configured to transmit and/or receive information to and/or from one or more other nodes, e.g., via any communication technology. Such communication may occur via one or more antennas that are either internal or external to the node 600. The processing circuitry 610 is configured to perform processing described above, e.g., in FIGS. 2, 4, 5, 6 and/or 7, such as by executing instructions stored in memory 630. The processing circuitry 610 in this regard may implement certain functional means, units, or modules.

Figure 16:
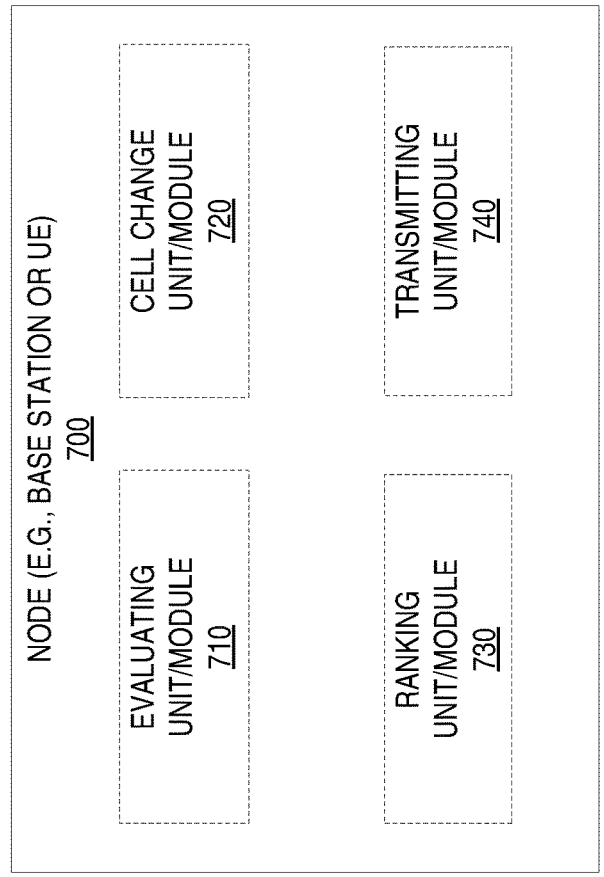
FIG. 16 is a block diagram of a node in a wireless communication system according to other embodiments.

FIG. 16 illustrates a node 700 implemented in accordance with one or more other embodiments. The node 700 may be a radio network node 18, a wireless device 16 (e.g., a UE), or any other node in the system 10. As shown, the 700 implements various functional means, units, or modules, e.g., via the processing circuitry 610 in FIG. 15 and/or via software code. These functional means, units, or modules, e.g., for implementing the method in FIG. 5, include for instance an evaluating unit or module 710 for evaluating whether a wireless device 16 is to perform a cell change from a first cell 22A to a second cell 22B of the wireless communication system 10, based on a relation between respective coverage levels with which the first and second cells 22A, 22B are accessible by the wireless device 16.

The node 700 may also include a cell change unit or module 720 for performing, or requesting the wireless device 16 to perform, the cell change from the first cell 22A to the second cell 22B in accordance with that evaluating.

In some embodiments, the node 700 also comprises a ranking unit or module 730 for performing ranking processing as described herein. Alternatively or additionally, the node 700 may comprise a transmitting unit or module 740 for transmitting information indicating margins (e.g., M1, M2, M3) with which to evaluate cell ranking for performing a change between cells with different possible coverage level relations.

Alternatively or additionally, the evaluating unit or module 710 for evaluating whether a wireless device 16 is to perform a cell change from a first cell 22A to a second cell 22B of the wireless communication system 10, based on a coverage level of the wireless device 16 with respect to the first cell 22A and a coverage level of the wireless device 16 with respect to the second cell 22B. In some embodiments, for instance, the evaluating unit or module 710 may be for evaluating that the second cell 22B has met a reselection criterion for the wireless device 16, provided that the second cell 22B is ranked better than the first cell 22A by at least a margin, wherein the value of the margin depends on a coverage level of the wireless device 16 with respect to the first cell 22A and a coverage level of the wireless device 16 with respect to the second cell 22B.

Those skilled in the art will also appreciate that embodiments herein further include corresponding computer programs.

A computer program comprises instructions which, when executed on at least one processor of a node, cause the node to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a node, cause the node to perform as described above.

Embodiments further include a computer program product comprising program code portions for performing the steps of any of the embodiments herein when the computer program product is executed by a computing device. This computer program product may be stored on a computer readable recording medium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method performed in a wireless communication system, the method comprising:
ranking a first cell and a second cell of the wireless communication system according to one or more defined cell-ranking criteria; and
evaluating that the second cell has met a reselection criterion for a wireless device, provided that the second cell is ranked better than the first cell by at least a margin, wherein the value of the margin depends on a coverage level of the wireless device with respect to the first cell and a coverage level of the wireless device with respect to the second cell;
wherein the margin comprises a maximum between a measurement inaccuracy level, defined for the coverage level of the wireless device with respect to the first cell and a measurement inaccuracy level defined for the coverage level of the wireless device with respect to the second cell; and
wherein the measurement inaccuracy levels include magnitudes of absolute reference signal received power accuracy levels, or magnitudes of relative reference signal received power accuracy levels, of the first and second cells.

2. The method of claim 1, wherein the value of the margin is specified by a table that maps different possible combinations of the coverage level of the wireless device with respect to the first cell and the coverage level of the wireless device with respect to the second cell to different possible values of the margin.

3. The method of claim 1, wherein the value of the margin depends on a relation between a signal quality measurement performed on a signal from the first cell and a signal quality measurement performed on a signal from the second cell.

4. The method of claim 1, wherein the value of the margin is specified by a table that maps different possible combinations of signal quality ranges, within which signal quality measurements performed on signals from the first and second cells are included, to different possible values of the margin.

5. The method of claim 1, further comprising performing, or requesting the wireless device to perform, the cell change from the first cell to the second cell in accordance with the evaluating.

6. The method of claim 1, wherein the method is performed by the wireless device.

7. The method of claim 1, wherein the method is performed by a network node in the wireless communication system.

8. The method of claim 1, wherein the wireless communication system is a narrowband internet of things (NB-IoT) system.

9. A node for use in a wireless communication system, the node comprising:
processing circuitry; and
memory containing instructions executable by the processing circuitry whereby the node is operative to:
rank a first cell and a second cell of the wireless communication system according to one or more defined cell-ranking criteria; and
evaluate that the second cell has met a reselection criterion for a wireless device, provided that the second cell is ranked better than the first cell by at least a margin, wherein the value of the margin depends on a coverage level of the wireless device with respect to the first cell and a coverage level of the wireless device with respect to the second cell;
wherein the margin comprises a maximum between a measurement inaccuracy level, defined for the coverage level of the wireless device with respect to the first cell and a measurement inaccuracy level defined for the coverage level of the wireless device with respect to the second cell; and
wherein the measurement inaccuracy levels include magnitudes of absolute reference signal received power accuracy levels, or magnitudes of relative reference signal received power accuracy levels, of the first and second cells.

10. A non-transitory computer readable recording medium storing a computer program product for controlling a node for use in a wireless communication system, the computer program product comprising software instructions which, when run on processing circuitry of the node, causes the node to:
rank a first cell and a second cell of the wireless communication system according to one or more defined cell-ranking criteria; and
evaluate that the second cell has met a reselection criterion for a wireless device, provided that the second cell is ranked better than the first cell by at least a margin, wherein the value of the margin depends on a coverage level of the wireless device with respect to the first cell and a coverage level of the wireless device with respect to the second cell;
wherein the margin comprises a maximum between a measurement inaccuracy level, defined for the coverage level of the wireless device with respect to the first cell and a measurement inaccuracy level defined for the coverage level of the wireless device with respect to the second cell; and
wherein the measurement inaccuracy levels include magnitudes of absolute reference signal received power accuracy levels, or magnitudes of relative reference signal received power accuracy levels, of the first and second cells.

* * * * *